(12) United States Patent
Koizumi

(10) Patent No.: US 11,937,179 B2
(45) Date of Patent: Mar. 19, 2024

(54) ELECTRONIC APPARATUS AND COMMUNICATION CONTROL METHOD

(71) Applicant: SEIKO EPSON CORPORATION, Tokyo (JP)

(72) Inventor: Junpei Koizumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 103 days.

(21) Appl. No.: 17/210,612

(22) Filed: Mar. 24, 2021

(65) Prior Publication Data
US 2021/0306947 A1    Sep. 30, 2021

(30) Foreign Application Priority Data
Mar. 26, 2020    (JP) .................. 2020-055383

(51) Int. Cl.
  *H04W 52/02*    (2009.01)
  *G06F 1/3234*    (2019.01)
  *G06F 3/12*    (2006.01)
  *H04N 1/00*    (2006.01)
  *H04W 48/16*    (2009.01)
  *H04W 76/19*    (2018.01)
  *H04W 88/08*    (2009.01)

(52) U.S. Cl.
  CPC ...... *H04W 52/0206* (2013.01); *G06F 3/1203* (2013.01); *G06F 3/123* (2013.01); *G06F 3/1292* (2013.01); *H04W 76/19* (2018.02); *H04W 88/08* (2013.01)

(58) Field of Classification Search
CPC . H04W 52/0206; H04W 76/19; H04W 88/08; G06F 3/1203; G06F 3/123; G06F 3/1292
See application file for complete search history.

(56) References Cited

U.S. PATENT DOCUMENTS

| 5,799,241 | A | 8/1998 | Matsubara et al. |
| 10,034,210 | B2 | 7/2018 | Hara |
| 11,175,868 | B2 | 11/2021 | Ueno |
| 2016/0262067 | A1 | 9/2016 | Hara |
| 2017/0164287 | A1* | 6/2017 | Ozawa ............... H04W 4/80 |

(Continued)

FOREIGN PATENT DOCUMENTS

| JP | H08-265823 A | 10/1996 |
| JP | 2004-343458 A | 12/2004 |

(Continued)

*Primary Examiner* — Jeffrey M Rutkowski
*Assistant Examiner* — Christopher Nguyen
(74) *Attorney, Agent, or Firm* — Global IP Counselors, LLP

(57) ABSTRACT

An electronic apparatus includes: a wireless communication unit wirelessly communicating via an external access point; and a processing unit operating in one of a plurality of operation modes including a first operation mode and a second operation mode having lower power consumption than the first operation mode, the processing unit controlling the wireless communication unit. The processing unit executes first scan processing as scan processing for the access point when the operation mode is the first operation mode. The processing unit executes second scan processing in which a scanning target is limited compared with the first scan processing, when the operation mode is the second operation mode.

8 Claims, 7 Drawing Sheets

(56) References Cited

U.S. PATENT DOCUMENTS

| | | | | |
|---|---|---|---|---|
| 2017/0339548 A1* | 11/2017 | Moriya | ............... | H04W 48/16 |
| 2018/0034707 A1* | 2/2018 | Aoki | ................. | H04W 48/20 |
| 2019/0141620 A1* | 5/2019 | Pujari | ................ | H04W 48/16 |
| 2020/0073602 A1* | 3/2020 | Ueno | ................. | G06F 3/1221 |
| 2020/0196358 A1* | 6/2020 | Kim | ................... | H04W 8/005 |
| 2020/0229067 A1* | 7/2020 | Hashemi | ............ | H04B 7/0617 |
| 2020/0245245 A1* | 7/2020 | Iwasaki | ............. | G06F 3/1221 |
| 2021/0100045 A1* | 4/2021 | Tsuji | ................. | H04W 12/50 |

FOREIGN PATENT DOCUMENTS

| | | |
|---|---|---|
| JP | 2016-163186 A | 9/2016 |
| JP | 2020-036110 A | 3/2020 |

* cited by examiner

|  | NORMAL OPERATION MODE | FIRST POWER-SAVING MODE | SECOND POWER-SAVING MODE |
|---|---|---|---|
| FIRST LIMITATION | NOT APPLY | APPLY | APPLY |
| SECOND LIMITATION | NOT APPLY | NOT APPLY | APPLY |
| THIRD LIMITATION | NOT APPLY | NOT APPLY | APPLY |

ELECTRONIC APPARATUS AND COMMUNICATION CONTROL METHOD

The present application is based on, and claims priority from JP Application Serial Number 2020-055383, filed Mar. 26, 2020, the disclosure of which is hereby incorporated by reference herein in its entirety.

BACKGROUND

1. Technical Field

The present disclosure relates to an electronic apparatus and a communication control method or the like.

2. Related Art

An apparatus performing scan processing to search for an apparatus that is a connection target in wireless communication is broadly known. For example, scan processing in wireless communication conforming to the Wi-Fi standard is SSID (service set identifier) scan.

JP-A-8-265823 discloses a technique of reducing the time during which a subordinate device is in a receiving mode, by using a limited scan. JP-A-2004-343458 discloses a technique of scanning a base station according to an SSID search priority degree list based on connection history. JP-A-2004-343458 also discloses a technique in which a user sets the number of SSIDs to be stored.

The related-art techniques disclosed in JP-A-8-265823 and JP-A-2004-343458 or the like do not take operation modes of the electronic apparatus into consideration. Specifically, in an electronic apparatus including a power-consuming operation mode and a less power-consuming operation mode, desired scan processing varies depending on the operation mode. Therefore, in the related-art techniques, for example, it is hard to properly scan a connection destination while maintaining a power-saving state.

SUMMARY

An aspect of the present disclosure relates to an electronic apparatus including: a wireless communication unit wirelessly communicating via an external access point; and a processing unit operating in one of a plurality of operation modes including a first operation mode and a second operation mode having lower power consumption than the first operation mode, the processing unit controlling the wireless communication unit. The processing unit executes first scan processing as scan processing for the access point when the operation mode is the first operation mode. The processing unit executes second scan processing in which a scanning target is limited compared with the first scan processing, when the operation mode is the second operation mode.

Another aspect of the present disclosure relates to a communication control method for an electronic apparatus is provided. The electronic apparatus operates in one of a plurality of operation modes including a first operation mode and a second operation mode having lower power consumption than the first operation mode, and wirelessly communicates with an external access point. The communication control method includes: executing first scan processing as scan processing for the access point when the operation mode is the first operation mode; and executing second scan processing in which a scanning target is limited compared with the first scan processing, when the operation mode is the second operation mode.

DESCRIPTION OF EXEMPLARY EMBODIMENTS

An embodiment will now be described. The embodiment described below should not unduly limit the content described in the appended claims. Not all the components described in the embodiment are necessarily essential components.

1. System Configuration

Figure 1:
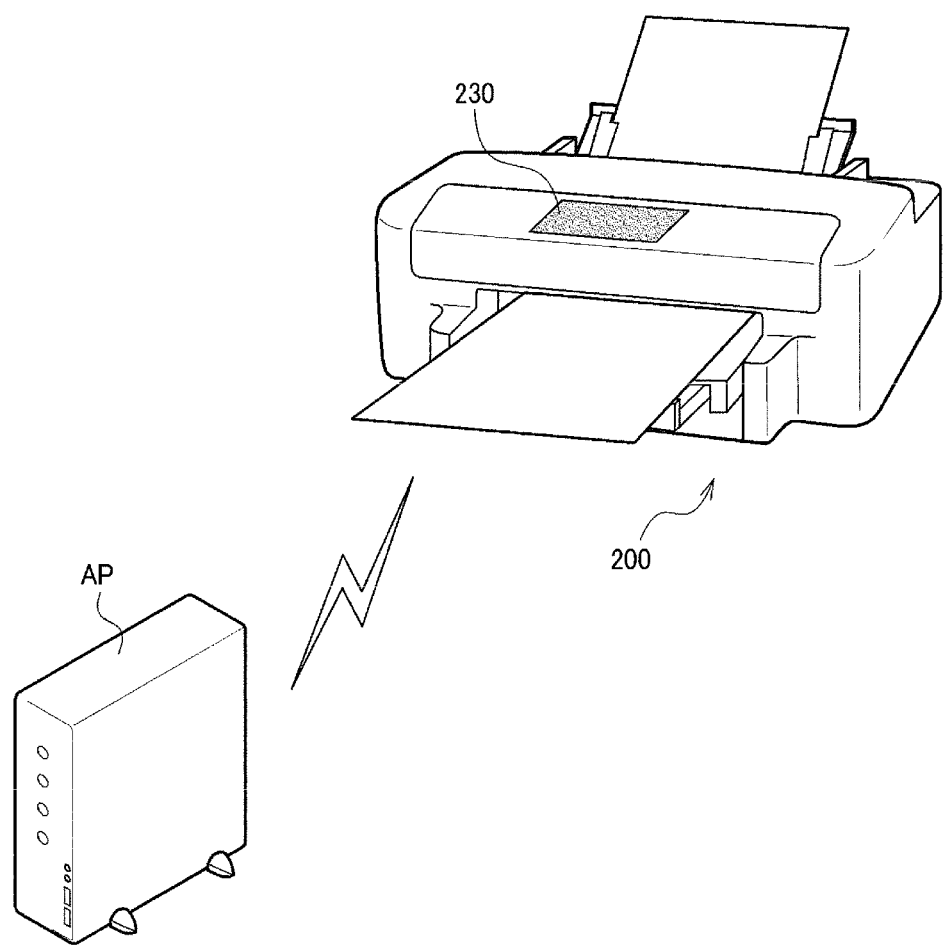
FIG. 1 explains connection between an electronic apparatus and an access point.

FIG. 1 schematically shows an example of a system configuration according to this embodiment. As shown in FIG. 1, an electronic apparatus 200 in this embodiment is connected to an access point AP. The access point AP is, for example, a wireless router having a router function.

The electronic apparatus 200 is, for example, a printer. Alternatively, the electronic apparatus 200 may be a scanner, facsimile machine, or copy machine. The electronic apparatus 200 may be an MFP (multifunction peripheral) having a plurality of functions. An MFP having a printing function is an example of the printer. Alternatively, the electronic apparatus 200 maybe a projector, head-mounted display device, wearable device, biological information measuring device, robot, video device, portable information terminal, physical quantity measuring device, or the like. The biological information measuring device is a pulse monitor, pedometer, activity tracker, or the like. The video device is a camera or the like. The portable information terminal is a smartphone, portable game machine, or the like.

The electronic apparatus 200 wirelessly communicates with the access point AP. The wireless communication in this case is communication using the Wi-Fi (trademark registered) technique. The Wi-Fi technique is a communication technique, for example, based on the IEEE (Institute of Electrical and Electronics Engineers) 802.11 standard and its equivalent.

Figure 2:
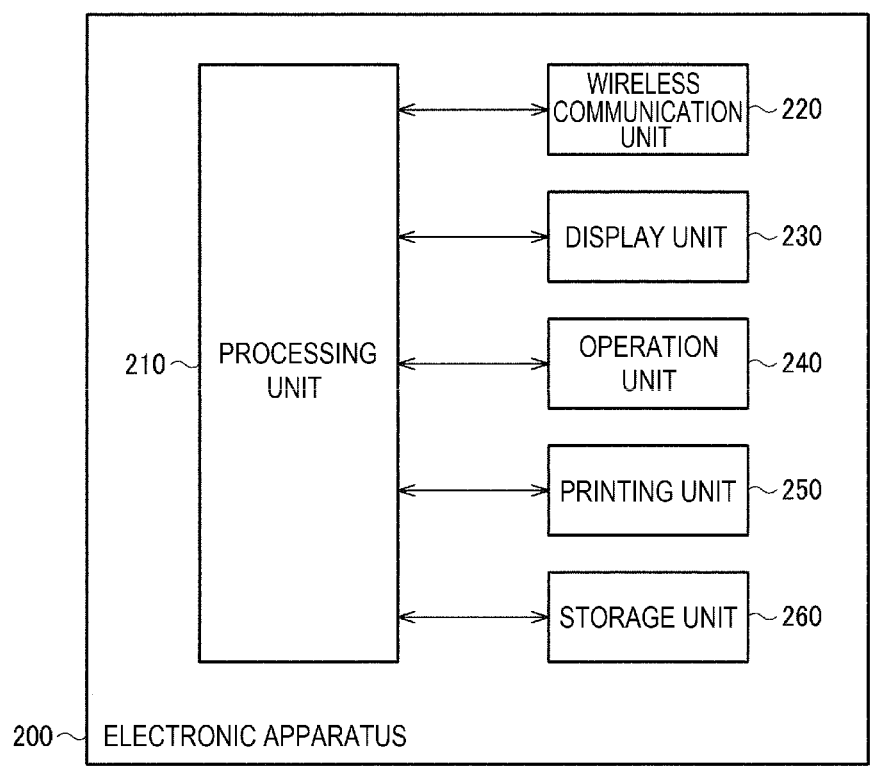
FIG. 2 shows a configuration example of the electronic apparatus.

FIG. 2 is a block diagram showing an example of the configuration of the electronic apparatus 200. FIG. 2 shows the electronic apparatus 200 having a printing function. In the description below, too, an example where the electronic apparatus 200 is a printer is described according to need. However, the electronic apparatus 200 can be extended to other functions than the printer, as described above. The electronic apparatus 200 includes a processing unit 210, a wireless communication unit 220, a display unit 230, an operation unit 240, a printing unit 250, and a storage unit 260.

The processing unit 210 controls each part of the electronic apparatus 200. Each part of the electronic apparatus 200 is, for example, the wireless communication unit 220, the storage unit 260, the printing unit 250, and the like. The processing unit 210 is specifically a processor or controller. For example, the processing unit 210 can include a plurality of CPUs such as a main CPU and a sub CPU. The main CPU controls each part of the electronic apparatus 200 and comprehensively controls the electronic apparatus 200. The sub CPU is, for example, a CPU performing communication control for the wireless communication unit 220. Alternatively, when the electronic apparatus 200 is a printer, another CPU performing various kinds of processing for printing may be provided.

The processing unit 210 in this embodiment is formed of the following hardware. The hardware can include at least one of a circuit processing a digital signal and a circuit processing an analog signal. For example, the hardware can be formed of one or a plurality of circuit devices or one or a plurality of circuit elements installed on a circuit board. The one or plurality of circuit devices is, for example, an IC(s) (integrated circuit(s)), FPGA(s) (field-programmable gate array(s)), or the like. The one or plurality of circuit elements is, for example, a resistor(s), capacitor(s), or the like.

The processing unit 210 may also be implemented by the following processor. The electronic apparatus 200 in this embodiment includes a memory storing information, and a processor operating based on the information stored in the memory. The information is, for example, a program and various data or the like. The processor includes hardware. As the processor, various processors such as a CPU (central processing unit), a GPU (graphics processing unit), and a DSP (digital signal processor) can be used. The memory may be a semiconductor memory such as an SRAM (static random-access memory) or DRAM (dynamic random-access memory), a register, a magnetic storage device such as a hard disk device, or an optical storage device such as an optical disk device. For example, the memory stores a computer-readable command, and the processor executes this command and thus implements the function of the processing unit 210 in the form of processing. The command in this case may be a command in a command set that forms a program, or a command instructing a hardware circuit in the processor to perform an operation. Also, the entirety or a part of the processing unit 210 may be implemented by cloud computing.

The wireless communication unit 220 is implemented by at least one wireless communication device. The wireless communication device may also be referred to as wireless communication chip. The wireless communication device in this example includes a wireless communication device executing wireless communication conforming to the Wi-Fi standard. However, the wireless communication unit 220 may include a wireless communication device executing wireless communication conforming to other standards than the Wi-Fi standard. The other standards than the Wi-Fi standard may be, for example, Bluetooth (trademark registered), and in a narrower sense, BLE (Bluetooth Low Energy).

The display unit 230 is formed of a display or the like displaying various kinds of information to a user. The operation unit 240 is formed of a button or the like accepting an input operation from the user. The display unit 230 and the operation unit 240 may be formed in a unified manner, for example, by a touch panel.

The printing unit 250 includes a print engine. The print engine is a mechanical configuration to execute printing of an image on a print medium. The print engine includes, for example, a conveyor mechanism, an inkjet-type ejection head, a drive mechanism for a carriage including the ejection head, and the like. The print engine ejects an ink from the ejection head to a print medium conveyed by the conveyor mechanism and thus prints an image on the print medium. The print medium may be paper, cloth, or other types of medium. The specific configuration of the print engine is not limited to the example described here. The print engine may be configured to print with a toner by an electrophotography technique.

The storage unit 260 stores various kinds of information such as data and a program. The processing unit 210 and the wireless communication unit 220 operate, for example, using the storage unit 260 as a work area. The storage unit 260 may be a semiconductor memory such as an SRAM or DRAM, a register, a magnetic storage device, or an optical storage device. The storage unit 260 may store data transmitted via wireless communication from an information processing device connected to the access point AP. The data in this case is, for example, data used for printing by the printing unit 250.

Figure 3:
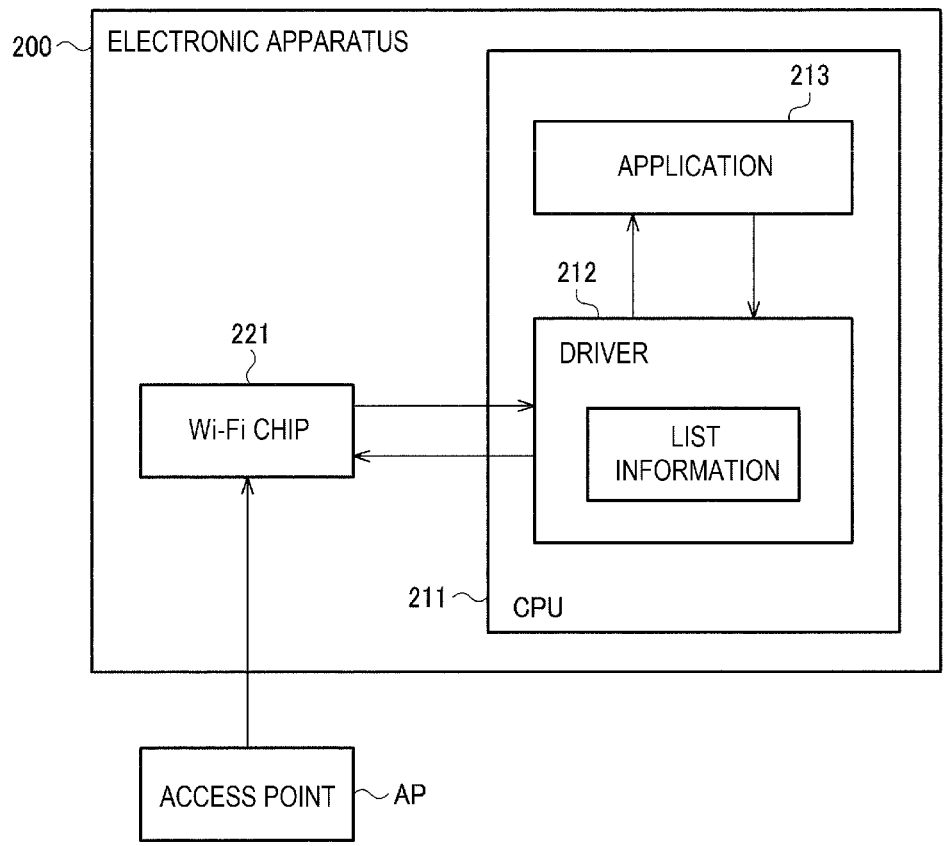
FIG. 3 shows a detailed configuration example of a processing unit and a wireless communication unit.

FIG. 3 shows a specific configuration example of the processing unit 210 and the wireless communication unit 220 in the electronic apparatus 200. As described above, the wireless communication unit 220 may be implemented by a wireless communication chip, specifically, a Wi-Fi chip 221 performing wireless communication conforming to the Wi-Fi standard. The processing unit 210 is a processor, for example, a CPU 211.

The CPU 211 includes, for example, a driver 212 performing drive control for the Wi-Fi chip 221, and an application 213. For example, the storage unit 260 stores driver software for controlling the Wi-Fi chip 221, and application software for performing processing with respect to wireless communication.

The CPU 211 loads the driver software from the storage unit 260, operates according to this driver software, and thus controls the Wi-Fi chip 221. The CPU 211 also loads the application software from the storage unit 260, operates according to this application software, and thus performing processing with respect to wireless communication. The driver 212 shown in FIG. 3 represents that, for example, a part of the CPU 211 operates according to the driver software and thus controls the Wi-Fi chip 221. Similarly, the application 213 shown in FIG. 3 represents that, for example, a part of the CPU 211 operates according to the application software and thus performs processing with respect to input to and output from the driver 212 and information from the driver 212.

The processing unit 210 of the electronic apparatus 200 may also include a different processor from the CPU 211 shown in FIG. 3. For example, the CPU 211 is a sub CPU for communication. The processing unit 210 may also include a main CPU performing overall control of the electronic apparatus 200 such as printing control and power-saving control. In this case, the CPU 211 controls the driver 212, based on an instruction from the main CPU, not illustrated. The CPU 211 also operates in an operation mode decided by the main CPU.

The Wi-Fi chip 221 acquires information from the access point AP and outputs the acquired information to the driver 212. For example, in SSID scan to search for the access point AP present in the peripheries, the Wi-Fi chip 221 receives a beacon signal conforming to the Wi-Fi standard from the access point AP and outputs the received beacon signal to the driver 212.

Based on the signal received from the Wi-Fi chip 221, the driver 212 converts information included in the beacon signal into a format that can be processed by the application 213, and holds the converted information as list information. The driver 212 transmits the list information to the application 213 when the SSID scan processing is finished. In normal scan processing, for example, the Wi-Fi chip 221 performs processing of receiving a beacon signal on all the channels while sequentially switching from one channel to another, under the control of the driver 212. In the description below, the SSID scan processing without any particular limitation is referred to as full scan.

The wireless communication channels based on the Wi-Fi technique include, for example, channels in the 2.4 GHz band and channels in the 5 GHz band. The channels in the 2.4 GHz band includes 1 ch, 2 ch, . . . , and 14 ch. The channels in the 5 GHz band include 36 ch, 40 ch, 44 ch, 48 ch in the 5.2 GHz band, 52 ch, 56 ch, 60 ch, 64 ch in the 5.3 GHz band, 100 ch, 104 ch, . . . , 140 ch in the 5.6 GHz band, and 149 ch, 153 ch, . . . , 165 ch in the 5.8 GHz band.

In the full scan, scan processing is sequentially performed for all the above channels. In some countries and regions, the use of a predetermined channel is prohibited by law. Therefore, for the channel whose use is prohibited, the scan processing can be omitted.

In the full scan, there is no limitation on the SSID or the like. Therefore, when the Wi-Fi chip 221 receives a beacon signal, the driver 212 performs processing such as format conversion of the beacon signal and adds the result of the processing to the list information.

The beacon signal conforming to the Wi-Fi standard includes information about a security standard and various kinds of support information in addition to the SSID of the access point AP. The security standard is, for example, WEP (Wired Equivalent Privacy), WPA (Wi-Fi Protected Access), WPA2 (Wi-Fi Protected Access 2), WPA3 (Wi-Fi Protected Access 3), or the like. The security standard may include information about an encryption technique. The encryption technique includes TKIP (Temporal Key Integrity Protocol), AES (Advanced Encryption Standard), or the like. The support information includes information, for example, about which of the IEEE 802.11 standards is supported. The IEEE 802.11 standards include 802.11a, 802.11b, 802.11n, 802.11ac, or the like. The beacon signal also includes information representing a beacon transmission interval, channel information, and the like.

Figure 4:
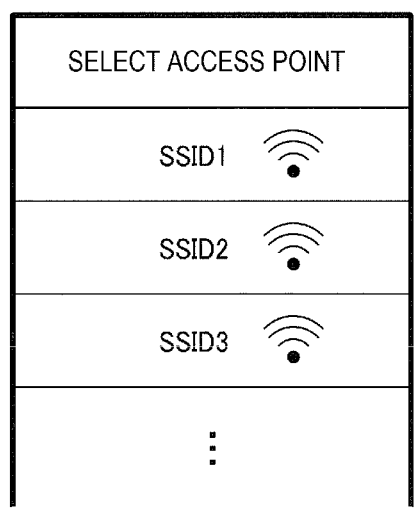
FIG. 4 shows an example of a screen displaying the result of scan processing.

On completion of the scanning of all the channels, the driver 212 transmits the prepared list information to the application 213. The application 213 performs processing based on the list information. For example, the application 213 performs processing of displaying an SSID list screen shown in FIG. 4, on the display unit 230. As shown in FIG. 4, the SSID list screen is a screen showing SSIDs found by scan processing. The SSID list screen may include other information such as radio wave intensity. The SSID list screen may be displayed at a different apparatus from the electronic apparatus 200.

The application 213 accepts an SSID selection operation by the user and performs processing to connect to the access point AP corresponding to the selected SSID. Specifically, the application 213 instructs the driver 212 to connect to the selected access point AP. The driver 212 controls the Wi-Fi chip 221 and thus executes a necessary sequence to establish connection such as transmission and reception of an authentication, transmission of an association request, and reception of an association response.

Figure 5:
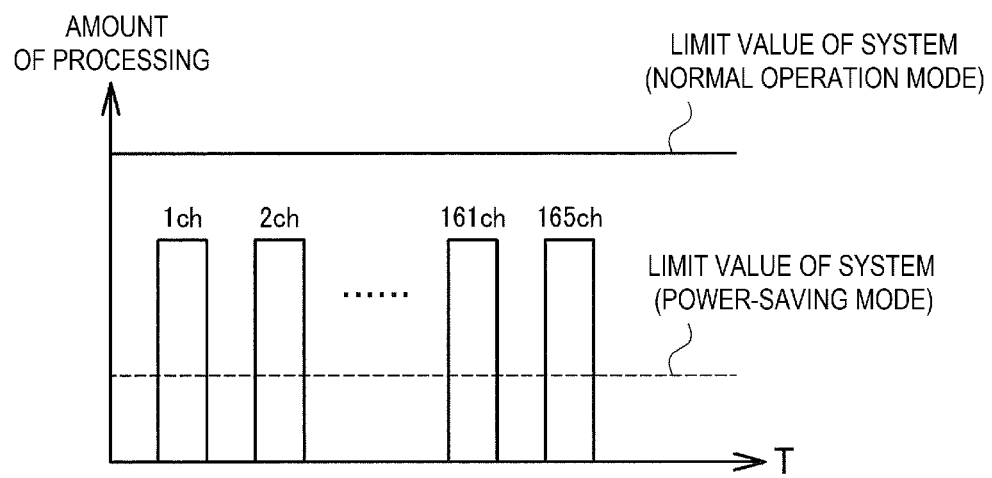
FIG. 5 shows the relationship between the processing load of full scan and the processing capacity of the processing unit.

FIG. 5 shows the relationship between the processing load of performing the full scan and the processing capacity of the electronic apparatus 200. In FIG. 5, the horizontal axis represents time and the vertical axis represents the processing load or the processing capacity. In the full scan, all beacon signals that are received using a predetermined channel are processing targets, and scanning needs to be done sequentially for many channels. As described above, a Wi-Fi beacon signal includes various kinds of information. Also, in an office or the like, there can be many access points AP in the peripheries of the electronic apparatus 200. When performing the full scan, a heavy processing load is placed on the driver 212 due to the need to take many beacon signals as processing targets.

When the processing unit 210 of the electronic apparatus 200 is operating in a normal operation mode, which is a power-consuming operation mode, the processing capacity of the processing unit 210 including the driver 212 is high, as shown in FIG. 5. Therefore, the full scan can be executed. Meanwhile, when the processing unit 210 is operating in a power-saving mode, which is a less power-consuming operation mode, the processing capacity is lower, as shown in FIG. 5. Therefore, the processing load of scan processing exceeds the processing capacity of the processing unit 210. In this state, proper scan processing cannot be executed. Therefore, the processing unit 210 needs to shift into the power-consuming operation mode. Consequently, the power-consuming period becomes longer, reducing the power-saving effect of changing the operation mode. The power-consuming operation mode is specifically a mode where a clock signal driving the processing unit 210 has a high frequency. The less power-consuming operation mode is a mode where the clock signal has a low frequency.

The electronic apparatus 200 is, for example, a printer. There is little need for the printer to operate at a high speed except when printing or when a user operation is performed. Therefore, a printer having a plurality of operation modes with different levels of power consumption and shifting into a power-saving mode, which is less power-consuming, based on a predetermined condition, is broadly used. However, in some cases, the SSID scan processing is executed during the power-saving mode. In such cases, the significance of setting the power-saving mode is reduced if the printer shifts to the normal operation mode each time. Meanwhile, if limited scan processing with a light processing load is executable, scan processing is enabled even in the power-saving mode. However, in the limited scan, the SSIDs to be searched are limited. Therefore, the access point AP that is a connection target may not be found unless the scan is executed according to the circumstance. The related-art techniques disclosed in JP-A-8-265823 and the like do not include any technique for scan processing that takes the operation mode of the electronic apparatus 200 into consideration.

The electronic apparatus 200 in this embodiment includes the wireless communication unit 220 and the processing unit 210, as described above. The wireless communication unit 220 wirelessly communicates via an external access point AP. The processing unit 210 operates in one of a plurality of operation modes including a first operation mode and a second operation mode having lower power consumption than the first operation mode. The processing unit 210 controls the wireless communication unit 220.

Here, the first operation mode is, for example, the normal operation mode, where the clock signal has a high frequency. The second operation mode is the power-saving mode, where the clock signal has a low frequency. There may be three or more operation modes, as described later as a modification example. For example, the power-saving mode may include a first power-saving mode and a second power-saving mode.

When the operation mode of the processing unit 210 is the first operation mode, the processing unit 210 executes first scan processing as scan processing for the access point AP. When the operation mode of the processing unit 210 is the second operation mode, the processing unit 210 executes second scan processing in which the scanning target is limited compared with the first scan processing. The first scan processing is, for example, the full scan. The second scan processing is the limited scan, where the scanning target is limited compared with the full scan. However, in the technique in this embodiment, the first scan processing is not limited to the full scan, provided that the scanning target is different between the first scan processing and the second scan processing.

Figure 6:
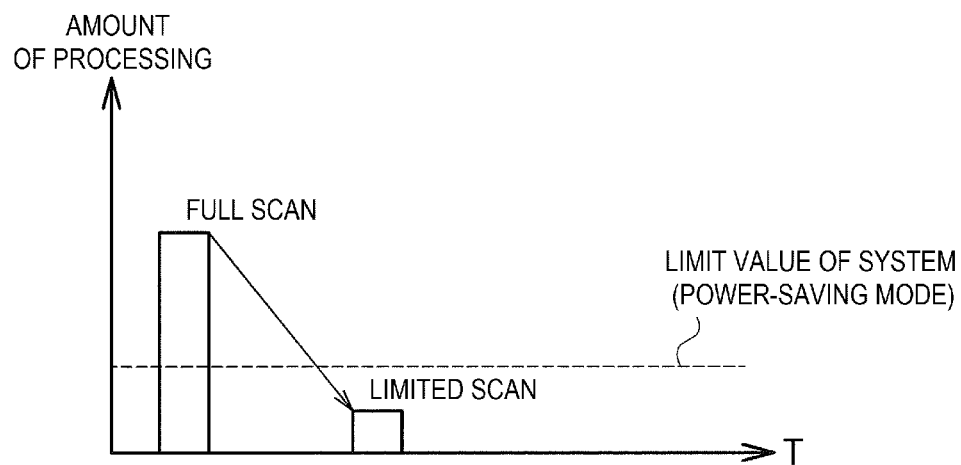
FIG. 6 shows the relationship between the processing load of full scan and the processing load of limited scan.

FIG. 6 shows the processing load of performing the limited scan. The processing load per channel can be reduced by limiting the SSIDs to be search targets or by limiting the upper limit number of SSIDs as described later. Consequently, the execution of proper scan processing is enabled even in the power-saving mode, where the processing capacity of the processing unit 210 is low. The limitation of scanning targets may be the limitation of channels, as described later. When channels to be searched are limited and SSIDs are not limited, the processing load per channel is not reduced and therefore a load exceeding the capacity of the processing unit 210 may be temporarily placed thereon. However, unlike in the full scan, the processing load does not continuously exceed the processing capacity. Therefore, the execution of proper scan processing is enabled in this case.

The processing performed by the electronic apparatus 200 in this embodiment may be implemented as a communication control method. The communication control method according to this embodiment is for the electronic apparatus 200 which operates in one of a plurality of operation modes including a first operation mode and a second operation mode having lower power consumption than the first operation mode and which wirelessly communicates with an external access point AP. The communication control method includes: executing first scan processing as scan processing for the access point AP when the operation mode is the first operation mode; and executing second scan processing in which the scanning target is limited compared with the first scan processing, when the operation mode is the second operation mode.

2. Flow of Processing

A flow of processing in this embodiment will now be described. Hereinafter, an example where the first operation mode is the normal operation mode and where the second operation mode is the power-saving mode is described. Also, an example where the first scan processing is the full scan is described. The second scan processing is the limited scan, as described above.

Two triggers of the occurrence of scan processing can be considered. The first trigger is that the link between the electronic apparatus 200 and the access point AP connected together up to this point is cut. The second trigger is that the user carries out an operation of changing the wireless communication setting of the electronic apparatus 200 and then connecting to the access point AP.

As a contributing factor of the occurrence of the first trigger, a temporary cut of the link, or roaming can be considered. The temporary cut of the link may be, for example, a case where the operation of at least one of the access point AP and the wireless communication unit 220 of the electronic apparatus 200 becomes temporarily unstable for a certain reason, or a case where the state of radio waves in the peripheries of the access point AP or the electronic apparatus 200 temporarily changes, or the like. In such a case, it is highly probable that the user wishes to maintain the connection with the access point AP that is previously connected. Therefore, it is effective to try reconnecting to the access point AP, using connection information about the access point AP that is previously connected. The connection information in this case is information used for connection, for example, an SSID and password.

Roaming is a switching between a plurality of access points AP. For example, the same SSID is given to a plurality of access points AP arranged at different positions in an office or the like. It is now assumed that the electronic apparatus 200 is moved from the vicinity of a first access point to the vicinity of a second access point. Normally, a higher radio wave intensity enables more stable communication. Therefore, it is thought that, to the electronic apparatus 200, the access point AP suitable for wireless communication changes from the first access point to the second access point. At this time, if connection information is shared among the plurality of access points AP as described above, a switching between the access points AP is enabled without accepting an operation of inputting the connection information or the like. In this case, too, it is effective to try reconnecting, using the connection information of the access point AP that is previously connected. In roaming, the access point AP to be the connection target changes. However, the case of roaming is similar to the temporary cut of the link in that the existing connection information can be used for reconnection.

The second trigger corresponds to, for example, a case where the user carries out an operation of displaying the SSID list screen shown in FIG. 4. At this time, which access point AP the user wishes to connect to is unknown information to the electronic apparatus 200. Therefore, it is difficult to limit the scanning target in advance and it is therefore highly necessary for the electronic apparatus 200 to perform the full scan. For example, the electronic apparatus 200 displays the SSID list screen, which is the result of the full scan, and performs processing of accepting a selection operation by the user.

As described above, when the second trigger occurs, it is highly necessary for the electronic apparatus 200 to perform the full scan. Meanwhile, when the first trigger occurs, even the limited scan may be able to find a desired access point. Thus, the electronic apparatus 200 changes the processing, based on the content of the trigger that has occurred and the current operation mode.

First, when the operation mode of the processing unit 210 is the first operation mode, the full scan can be executed, as shown in FIG. 5. Therefore, the processing unit 210 executes the full scan, whether the trigger of the scan processing is the first trigger or the second trigger.

Figure 7:
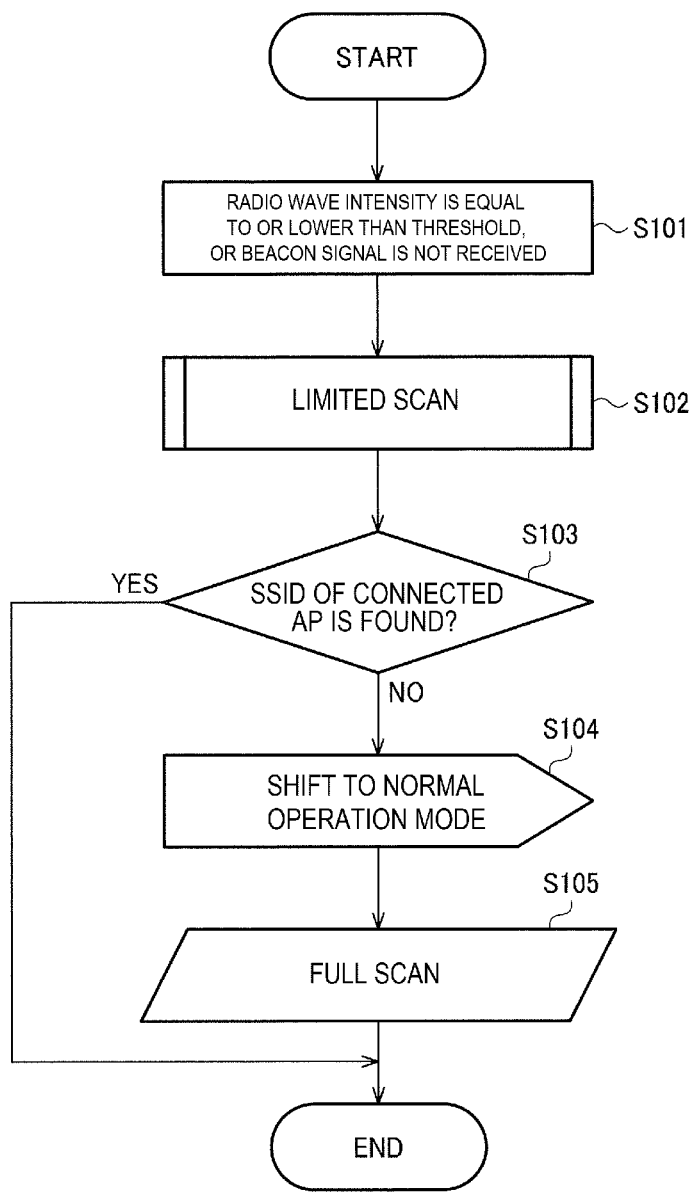
FIG. 7 is a flowchart explaining a flow of processing including scan processing.

FIG. 7 is a flowchart explaining the processing when the first trigger has occurred in the second operation mode. Specifically, when the reception intensity of a beacon signal from the connected access point AP is equal to or lower than a predetermined threshold or when a beacon signal is not received, the processing unit 210 determines that the first trigger has occurred (step S101).

The radio wave intensity in this example is specifically the RSSI (received signal strength indication) of the beacon signal. The beacon signal is transmitted from the access point AP on a predetermined cycle. However, even when the connection state is normal, the wireless communication unit 220 may fail to receive the beacon signal for some reason. Therefore, that the beacon signal is not received in this example specifically means the state where the reception of the beacon signal is continuously disabled for a predetermined period. The predetermined period is, for example, a time period of approximately 500 msec, though various modifications can be made. When it is determined that the first trigger has occurred, the processing unit 210 executes the limited scan while still in the second operation mode (step S102).

In the second scan processing in this embodiment, at least one limitation of a first limitation that limits the scanning target SSID to an SSID with connection history, a second limitation that limits the scanning target channel to a predetermined channel, and a third limitation that limits the number of scanning target SSIDs to a predetermined threshold or less, is placed on the first scan processing. Providing such a limitation enables a reduction in the load of the second scan processing, which is the limited scan, compared with the first scan.

Figure 8:
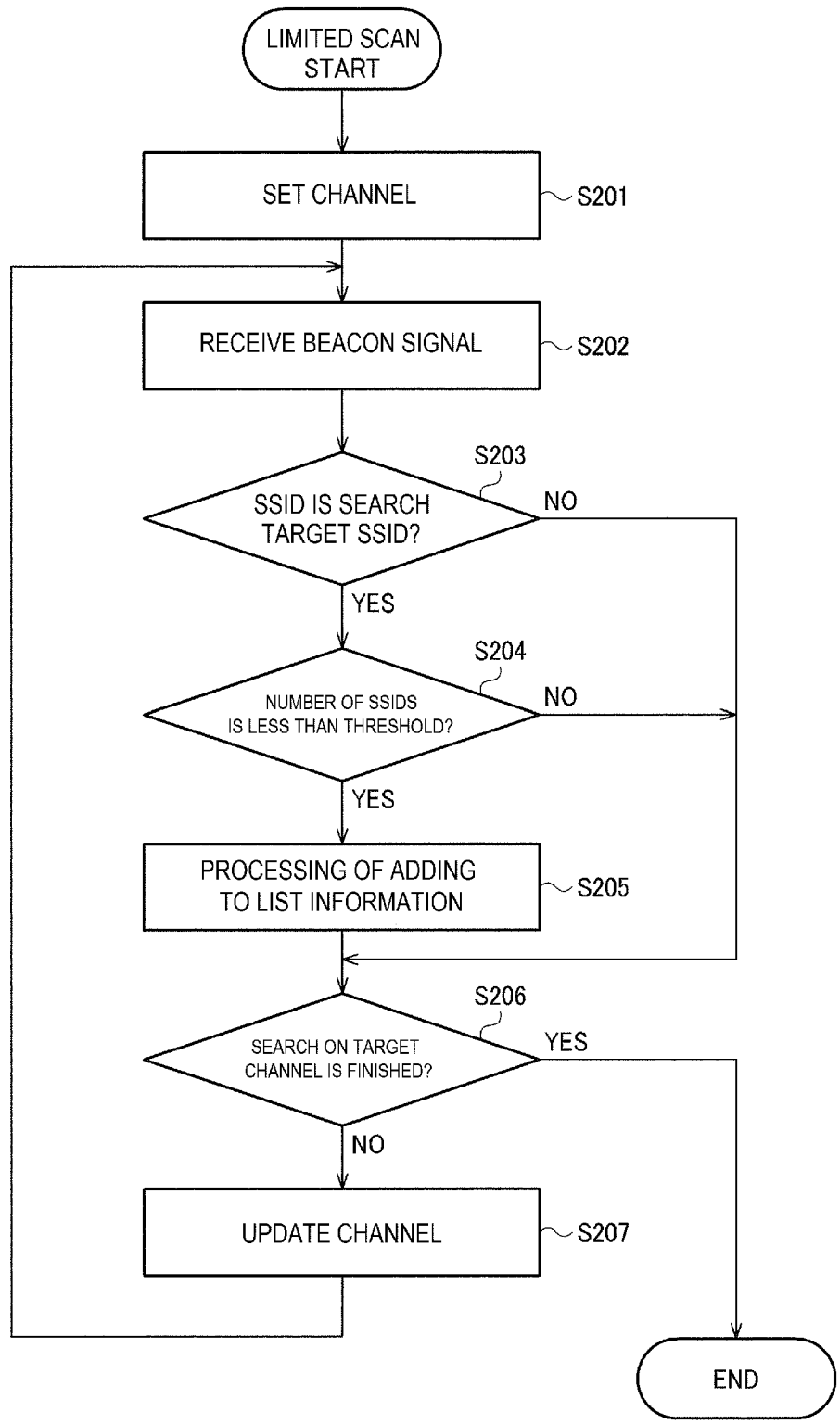
FIG. 8 is a flowchart explaining limited scan.

FIG. 8 is a flowchart explaining the processing in the limited scan. First, the processing unit 210 sets a channel to be a search target (step S201). For example, the processing unit 210 sets the channel used for wireless communication with the access point AP that is connected immediately before, as a search target channel. The processing in step S201 corresponds to the second limitation. Limiting the channel enables a reduction in the number of times the processing in step S202 onward is executed, and therefore enables a reduction in the processing load. The search target channel in this example is not limited to the channel that is used immediately before, and may include two or more channels that have been used in wireless connection in the past.

Next, the processing unit 210 performs processing of receiving a beacon signal from the access point AP, using the set channel (step S202). Specifically, the Wi-Fi chip 221 receives a beacon signal and the driver 212 acquires the beacon signal. When a plurality of beacon signals are received on one channel, the processing in steps S203 to S205 is sequentially executed for each beacon signal.

The processing unit 210 refers to an SSID part of the beacon signal acquired in step S202 and determines whether this SSID is the search target SSID or not (step S203). Specifically, the processing unit 210 determines whether or not the SSID included in the beacon signal coincides with the SSID of the access point AP that is connected immediately before.

When the SSID of the beacon signal is the search target SSID (Yes in step S203), the processing unit 210 determines whether the number of pieces of information added to the list information is less than a predetermined threshold or not (step S204). The threshold in this example is, for example, 10. However, various modifications can be made to the specific value. When the number of pieces of information added to the list information has reached the threshold, the processing unit 210 gives No as the result of the determination.

When Yes is given in both step S203 and step S204, the driver 212 performs processing such as format conversion on the received beacon signal and adds the result of the processing to the list information (step S205). Meanwhile, when No is given in at least one of step S203 and step S204, the driver 212 omits the processing in step S205. That is, the driver 212 omits further processing on the received beacon signal and destroys the information of the beacon signal.

The processing in step S203 corresponds to the first limitation. When the first limitation is carried out, the beacon signal to be a target of addition to the list information is limited to a beacon signal including a specified SSID. Since the beacon signal to be a target of addition to the list information is significantly limited, the processing load can be reduced. The determination in step S203 can be executed by reading only the SSID part of the beacon signal. Therefore, the load of this processing does not pose a significant problem.

The processing in step S204 corresponds to the third limitation. When the third limitation is carried out and information of a certain number of beacon signals is added, processing on the subsequent beacon signals can be omitted. Therefore, the load of the scan processing can be reduced.

FIG. 8 illustrates the processing on the assumption that the wireless communication unit 220 performs a passive scan (steps S202 to S204). That is, the wireless communication unit 220 waits for a beacon signal from the access point AP. However, the wireless communication unit 220 may perform an active scan. The active scan is the processing of transmitting a probe request and receiving a probe response from the access point AP. In this case, the first limitation is implemented by designating a predetermined SSID and transmitting a probe request. A probe response is not sent back from an access point AP having a different SSID. Therefore, the scanning target SSID can be limited. The third limitation can be implemented by not transmitting a probe request when the number of pieces of information already added to the list information exceeds a predetermined number. However, when performing the active scan, the electronic apparatus 200 needs to transmit radio waves. Since the use of a certain channel may be prohibited by law in some countries or regions, the passive scan is more advantageous in that the transmission of radio waves on such a channel is restrained.

Next, the processing unit 210 determines whether the scanning on all the search target channels is completed or not (step S206). When Yes in step S206, the processing unit 210 ends the limited scan processing. Specifically, the driver 212 outputs the list information as of this time to the application 213. When the search target channel is limited to one channel by the second limitation, the determination in step S206 result in Yes without exception. Therefore, this processing may be omitted.

When two or more channels are set as search targets and a channel or channels are left unsearched (No in step S206), the processing unit 210 performs processing of changing the channel of the Wi-Fi chip 221 to one of the unsearched channels (step S207) and then returns to step S202 to continue the processing.

Back to FIG. 7, after the execution of the limited scan, the processing unit 210 determines whether the SSID set as the search target is found or not (step S103). The search target SSID is the SSID used for the determination in step S203. For example, the processing in step S103 is the processing of determining whether the list information is empty or not.

When the search target SSID is found, the processing unit 210 ends the processing. After the processing shown in FIG. 7, for example, the processing unit 210 performs processing of automatically connecting to the SSID found by the search. When the search target SSID is not found, the processing unit 210 shifts to the normal operation mode (step S104). After shifting to the normal operation mode, the processing unit 210 executes the full scan (step S105).

As shown in FIG. 7, when the operation mode of the processing unit 210 is the second operation mode and the reception intensity of the beacon signal from the connected access point AP is equal to or lower than a predetermined threshold, or the beacon signal is not received, the processing unit 210 executes the second scan processing. In other words, the processing unit 210 executes the limited scan, based on the first trigger. As described above, in the case of the first trigger, the connection information used for connection up to this point may be able to be used. Since a desired access point AP may be able to be connected even by the limited scan, the execution of the limited scan is meaningful. Thus, a shift to the first operation mode in an unwanted situation can be restrained and therefore the power consumption by the electronic apparatus 200 can be reduced.

As shown in steps S104 and S105, when the connection target access point AP is not found by the second scan processing, the processing unit 210 may shift to the first operation mode and execute the first scan processing. When the electronic apparatus 200 is not connected to any access point AP, processing via the network cannot be executed. For example, the electronic apparatus 200 as a printer no longer can accept a print job from a terminal device connected to the same access point AP. The print job is information including image information to be a printing target and print setting information. The print setting information is information specifying a set value for a setting item such as sheet size, single-sided/double-sided, or color/monochrome.

When the original access point AP or the access point AP to choose by roaming is not found by the limited scan, it is useful to search for another connectable access point AP. For example, presenting a list of SSIDs found by the full scan enables improvement in the convenience of the user.

Figures 9, 10:
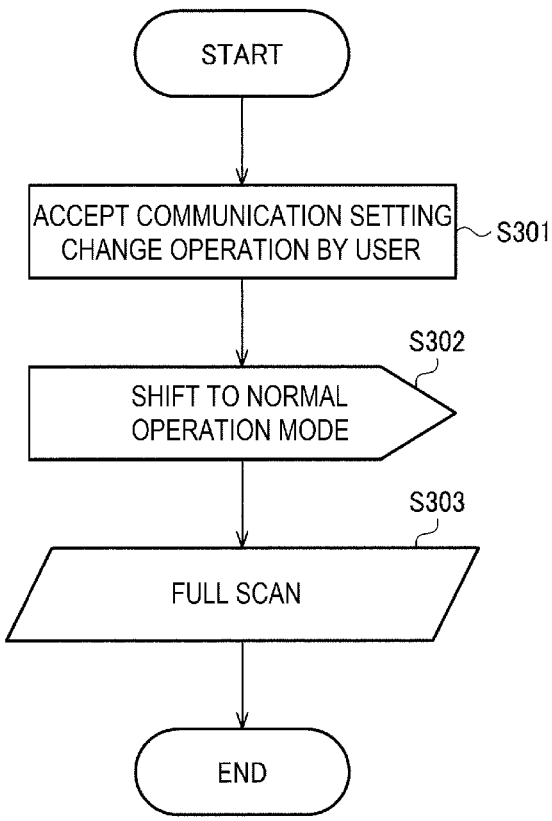
FIG. 9 is a flowchart explaining a flow processing including scan processing.
FIG. 10 shows an example of the relationship between operation mode and limitation content.

FIG. 9 is a flowchart explaining the processing when the second trigger has occurred in the second operation mode. Specifically, when a communication setting change operation by the user is accepted, the processing unit 210 determines that the second trigger has occurred (step S301). The communication setting in this example is specifically the setting for wireless communication and includes at least the setting of the access point AP to be connected. The communication setting may also include different information from the information specifying the access point AP, such as settings for security standard and encryption standard or the like.

As described above, on the occurrence of the second trigger, it is difficult to presume which access point AP the user wishes to connect to. Therefore, the scanning target cannot be limited. The processing unit 210 shifts to the normal operation mode (step S302) and executes the full scan (step S303) after shifting to the normal operation mode.

That is, when the operation mode of the processing unit 210 is the second operation mode and a change in the communication setting is carried out in response to a user instruction, the processing unit 210 shifts to the first operation mode and executes the first scan processing. Thus, in a situation where it is highly necessary to search a broad range for access points AP, a proper change of the operation mode and proper scan processing can be executed.

When a communication setting change operation is carried out using the operation unit 240 of the electronic apparatus 200, it is assumed that the operation mode of the processing unit 210 has shifted to the first operation mode, based on the user operation prior to this communication setting change operation. The user operation prior to the communication setting change operation is, for example, a recovery operation from the power-saving mode, a setting item selection operation, or the like. In this case, since the operation mode is the first operation mode on the occurrence of the second trigger, the full scan can be executed without changing the operation mode.

The case where a communication setting change is carried out in response to a user instruction in the second operation mode is, for example, the case where a change in the setting of the electronic apparatus 200 is carried out using a different terminal device from the electronic apparatus 200. For example, in the state where the electronic apparatus 200 and the terminal device are connected to the same access point AP or in the state where the electronic apparatus 200 and the terminal device are directly connected to each other, the user executes an operation to connect the electronic apparatus 200 to another access point AP, using the terminal device. In this case, the operation unit 240 of the electronic apparatus 200 is not operated. Therefore, the second operation mode of the processing unit 210 is maintained unless another operation such as a print operation is carried out.

3. Modification Examples

An example where two operation modes, the fist operation mode and the second operation, are employed is described above. The first operation mode is the normal operation mode. The second operation mode is the power-saving mode. However, there may be three or more operation modes.

For example, the operation modes in this embodiment may include a third operation mode having lower power consumption than the first operation mode and higher power consumption than the second operation mode. The third operation mode is a first power-saving mode. The second operation mode is a second power-saving mode. When the operation mode of the processing unit 210 is the third operation mode, the processing unit 210 executes third scan processing with a different content of scanning target limitation from both the first scan processing and the second scan processing. For example, when the first to third scan processing are compared in terms of the frequency of the clock signal, the frequency in the first operation mode is higher than in the third operation mode, and the frequency in the third operation mode is higher than in the second operation mode.

For example, when the operation mode of the processing unit 210 is the third operation mode, the processing unit 210 may execute the third scan processing, where the first limitation is placed on the first scan processing and where the second limitation and the third limitation are not placed. That is, the processing unit 210 limits the search target SSID to an SSID with connection history, in a narrower sense, the SSID of the access point AP that is connected last. Meanwhile, the processing unit 210 regards all the channels as search targets and does not limit the number of SSIDs held in the list information.

As described above, the situations where the limited scan is effective includes roaming. A plurality of access points AP provided in an environment where roaming is performed have the same SSID but may use different channels. Therefore, even in a situation where roaming may be performed, a proper SSID may not be found by the search when the second limitation is placed. Thus, even in the power-saving mode, it is desirable that the second limitation on channels is not placed when the processing capacity is relatively high.

When a large number of channels are defined as scanning targets, an SSID with a high radio wave intensity is not necessarily found early by the search. Consequently, when the third limitation is placed, there is a risk of the list information becoming filled with beacon signals with a low radio wave intensity. Thus, even in the power-saving mode, it is desirable that the third limitation on the number of SSIDs is not placed when the processing capacity is relatively high.

Meanwhile, when the operation mode of the processing unit 210 is the second operation mode, the processing unit 210 executes, as the second scan processing, scan processing in which two or more limitations of the first limitation, the second limitation, and the third limitation are placed on the first scan processing.

FIG. 10 shows an example of the relationship between operation mode and scan processing. As shown in FIG. 10, the full scan is enabled in the normal operation mode. Therefore, none of the first limitation, the second limitation, and the third limitation is applied. In the first power-saving mode, the first limitation is applied and the second limitation and the third limitation are not applied, for example, as described above. In the second power-saving mode, the processing unit 210 applies all of the first limitation, the second limitation, and the third limitation, as described above with reference to FIG. 8. However, FIG. 10 shows an example of limitations in each operation mode. The content of scan processing in each operation mode is not limited to FIG. 10 and can be modified in various manners. For example, in the second scan processing, one of the first limitation, the second limitation, and the third limitation may be omitted.

The embodiment has been described above in detail. However, a person skilled in the art can readily understand that various modifications can be made without substantially departing from the new matters and effects of the embodiment. Therefore, all such modification examples are included in the scope of the present disclosure. For example, a term described along with a different term having a broader meaning or the same meaning at least once in the specification or the drawings can be replaced with the different term at any part of the specification or the drawings. All combinations of the embodiment and modification examples are included in the scope of the present disclosure. The configuration and operation or the like of the electronic apparatus or the like are not limited to those described in the embodiment and can be implemented with various modifications.

What is claimed is:

1. An electronic apparatus comprising:
a wireless communication unit wirelessly communicating via an external access point; and
a processing unit operating in one of a plurality of operation modes including a first operation mode and a second operation mode having lower power consumption than the first operation mode, the processing unit controlling the wireless communication unit, wherein
the processing unit
determines whether the processing unit is operating in the first operation mode or in the second operation mode;
executes first scan processing as scan processing for the access point such that the first scan processing scans a first scanning target and a second scanning target in response to determining that the processing unit is operating in the first operation mode, and
executes second scan processing in which a scanning target is limited compared with the first scan processing such that the second scan processing scans the first scanning target but does not scan the second scanning target in response to determining that the processing unit is operating in the second operation mode, and
the processing unit starts executing the first scan processing after stopping the second operation mode and shifting to the first operation mode in response to a change in communication setting being carried out based on a user instruction while the processing unit is operating in the second operation mode.

2. The electronic apparatus according to claim 1, wherein the second scan processing is processing in which at least one limitation of a first limitation that limits a scanning target SSID (service set identifier) to an SSID with connection history, a second limitation that limits a scanning target channel to a predetermined channel, and a third limitation that limits a number of scanning target SSIDs to a predetermined threshold or less, is placed on the first scan processing.

3. The electronic apparatus according to claim 1, wherein
the plurality of operation modes include a third operation mode having lower power consumption than the first operation mode and higher power consumption than the second operation mode, and
the processing unit executes third scan processing with a different content of limitation on the scanning target from both the first scan processing and the second scan processing, when the operation mode is the third operation mode.

4. The electronic apparatus according to claim 2, wherein
the plurality of operation modes include a third operation mode having lower power consumption than the first operation mode and higher power consumption than the second operation mode, and
the processing unit
executes third scan processing in which the first limitation is placed on the first scan processing and in which the second limitation and the third limitation are not placed, when the operation mode is the third operation mode, and
executes the second scan processing in which two or more limitations of the first limitation, the second limitation, and the third limitation are placed on the first scan processing, when the operation mode is the second operation mode.

5. The electronic apparatus according to claim 1, wherein the processing unit executes the second scan processing, when the operation mode is the second operation mode and a reception intensity of a beacon signal from the access point that is connected is equal to or lower than a predetermined threshold, or the beacon signal is not received.

6. The electronic apparatus according to claim 1, wherein the processing unit shifts to the first operation mode and executes the first scan processing, when the operation mode is the second operation mode and the change in communication setting is carried out in response to the user instruction.

7. The electronic apparatus according to claim 1, wherein the processing unit shifts to the first operation mode and executes the first scan processing, when the access point that is a connection target is not found by the second scan processing.

8. A communication control method for an electronic apparatus that operates in one of a plurality of operation modes including a first operation mode and a second operation mode having lower power consumption than the first operation mode and that wirelessly communicates with an external access point, the communication control method comprising:
- determining whether the electronic apparatus is operating in the first operation mode or in the second operation mode,
- executing first scan processing as scan processing for the access point such that the first scan processing scans a first scanning target and a second scanning target in response to determining that the electronic apparatus is operating in the first operation mode; and
- executing second scan processing in which a scanning target is limited compared with the first scan processing such that the second scan processing scans the first scanning target but does not scan the second scanning target in response to determining that the electronic apparatus is operating in the second operation mode,
- the executing of the first scan processing starting after stopping the second operation mode and shifting to the first operation mode in response to a change in communication setting being carried out based on a user instruction while the electronic apparatus is operating in the second operation mode.

* * * * *